(12) United States Patent
Smith et al.

(10) Patent No.: US 9,069,807 B2
(45) Date of Patent: Jun. 30, 2015

(54) METHOD AND SYSTEM FOR IMPLEMENTING AN ARRAY USING DIFFERENT DATA STRUCTURES

(71) Applicant: Facebook, Inc., Menlo Park, CA (US)

(72) Inventors: Edwin Thur Gideon Smith, Newton, MA (US); Keith Adams, San Carlos, CA (US); Jason Owen Evans, Palo Alto, CA (US)

(73) Assignee: FACEBOOK, INC., Menlo Park, CA (US)

( * ) Notice: Subject to any disclaimer, the term of this patent is extended or adjusted under 35 U.S.C. 154(b) by 300 days.

(21) Appl. No.: 13/691,622

(22) Filed: Nov. 30, 2012

(65) Prior Publication Data

US 2014/0156708 A1    Jun. 5, 2014

(51) Int. Cl.
*G06F 17/30* (2006.01)

(52) U.S. Cl.
CPC ...... *G06F 17/30312* (2013.01); *G06F 17/3033* (2013.01); *G06F 17/30126* (2013.01)

(58) Field of Classification Search
CPC .......... G06F 17/3033; G06F 17/30126; G06F 17/30312
USPC ........................................................ 707/803
See application file for complete search history.

(56) References Cited

U.S. PATENT DOCUMENTS

| | | | | |
|---|---|---|---|---|
| 6,687,815 | B1 * | 2/2004 | Dwyer et al. | 713/1 |
| 6,961,733 | B2 * | 11/2005 | Mazzagatti | 707/999.006 |
| 8,484,427 | B1 * | 7/2013 | Goldobin et al. | 711/162 |
| 2002/0073068 | A1 * | 6/2002 | Guha | 707/1 |
| 2006/0156064 | A1 * | 7/2006 | Damani et al. | 714/16 |
| 2008/0307181 | A1 * | 12/2008 | Kuszmaul et al. | 711/164 |
| 2010/0217953 | A1 * | 8/2010 | Beaman et al. | 711/216 |
| 2011/0225391 | A1 * | 9/2011 | Burroughs et al. | 711/216 |
| 2011/0276744 | A1 * | 11/2011 | Sengupta et al. | 711/216 |
| 2013/0268770 | A1 * | 10/2013 | Hunt et al. | 713/189 |

\* cited by examiner

*Primary Examiner* — Rehana Perveen
*Assistant Examiner* — Tiffany Thuy Bui
(74) *Attorney, Agent, or Firm* — Perkins Coie LLP

(57) ABSTRACT

Disclosed are a method and system for implementing an array data type of a programming language using various data structures. The disclosed method includes a plurality of implementations in which the array data type may be implemented. The implementations provide an efficient way to retrieve elements from the array, especially in the order they are inserted into the array. The data structures also minimize the computing resources required to manage and access the array. The disclosed technique also selects one of the many implementations based on criteria such as access pattern or size of the array.

20 Claims, 14 Drawing Sheets

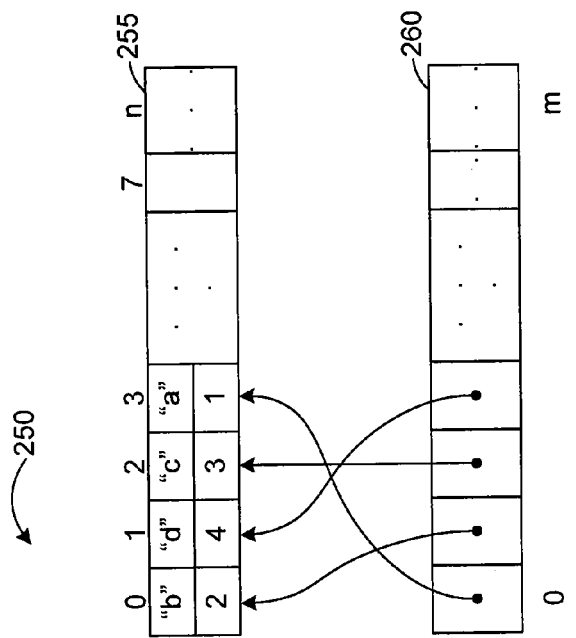
FIG. 2A
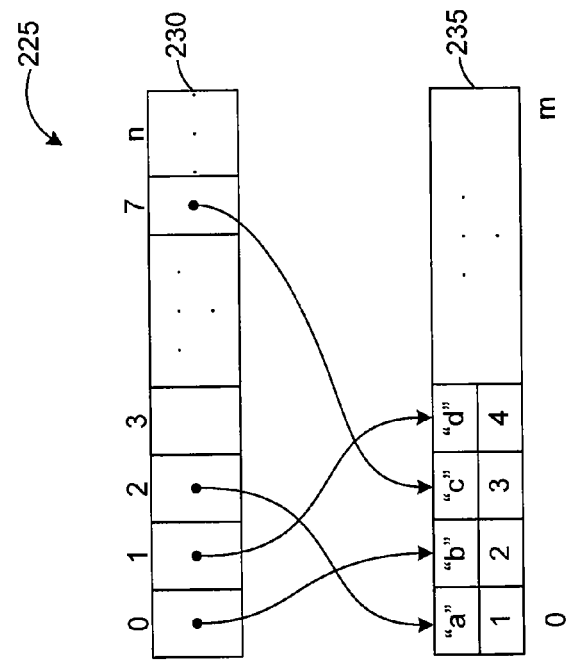
FIG. 2B
FIG. 2C

METHOD AND SYSTEM FOR IMPLEMENTING AN ARRAY USING DIFFERENT DATA STRUCTURES

FIELD OF INVENTION

This invention generally relates to data structures in computer programming languages. More specifically, the invention relates to implementing an array data type using different data structures.

BACKGROUND

In certain programming languages, array data type is implemented using a hashtable. The hashtable is a data structure having "n" number of "slots" of memory. The array elements are stored as key-value pairs in the slots of the hashtable. The index of the array is stored as a key and the element at the index is stored as a value in the hashtable. For example, in an array $arr=array(['a']=1), the array element, "1" at an index "a" is stored as a key-value pair ("a,1") in the hashtable. An element of the array is stored in one of the slots of the hashtable. The particular slot in which the element is stored is determined by hashing the index of the array to a particular slot. The hashing function determines a slot number for a given index.

Prior array implementation techniques have limitations in the way the array elements are stored. Certain implementation techniques do not inherently record or track the order in which the array elements are inserted into the array. So, applications that need to retrieve the elements in the order they were inserted into the array have to include their own logic in the application program to retrieve the elements in the order they were inserted.

Certain prior techniques that support retrieving or tracking the elements in the order they are inserted use pointers. Data is stored into a slot of the hashtable along with, for example, two pointers. One pointer points to the next inserted element and another one points to the previously inserted element. The pointers are updated as and when the elements are added or deleted from the hashtable. Storing pointers with every array element consumes significant memory. Also, reading the chain of pointers to retrieve the elements in the order they are inserted consumes significant processor time.

SUMMARY

The present teaching provides a variety of methods, systems and paradigms for implementing an array data type of a programming language using various data structures. Certain disclosed techniques include a plurality of implementations in which the array data type may be implemented. The implementations provide an efficient way to retrieve elements of the array, especially in the order they are inserted into the array. The data structures also minimize the computing resources required to manage and access the array. Other disclosed techniques also select one of the many implementations based on criteria including access pattern or size of the array.

In an embodiment, the array is a data type in a dynamic programming language, such as Personal Home Page (PHP). In other embodiments, the array could be part of other programming languages. The array stores data as key-value pairs, where a value is associated with a key of the key-value pair. Also, the key acts as an index of the array. In other embodiments, the array can store the data in other formats.

In a first implementation, the array is represented using a combination of a first data structure and a second data structure. The first data structure includes a plurality of contiguous memory buckets that store key-value pairs in the order in which the key-value pairs are inserted into the array. The second data structure includes a plurality of memory slots that store pointers that point to the buckets of the first data structure. Each of the slots corresponds to a key of the key-value pairs in the first data structure, and stores a pointer pointing to the bucket which has the value of the key. The key-value pairs may be retrieved in the order they are inserted by iterating through the first data structure. In an embodiment, the first data structure is an ordered container having contiguous blocks of memory, and the second data structure is a hashtable.

In a second implementation, the array is represented using a combination of a first data structure and a second data structure. The first data structure includes a plurality of slots of the memory that store key-value pairs of the array. Each of the slots correspond to a key of the key-value pairs. The second data structure includes a plurality of contiguous buckets of the memory that store pointers pointing to the slots containing key-value pairs. Each of the pointers is associated with one of the key-value pairs. Further, the buckets store the pointers in the order in which the corresponding key-value pairs are inserted into the array. The key value pairs may be retrieved in the order they were inserted by iterating through the second data structure to obtain the pointers to the slots containing the key-value pairs and then obtaining the key-value pairs from the slots pointed to by the pointers. In an embodiment, the first data structure is a hashtable and the second data structure is an ordered container having contiguous blocks of memory.

Some embodiments of the invention have other aspects, elements, features, and steps in addition to or in place of what is described above. These potential additions and replacements are described throughout the rest of the specification.

BRIEF DESCRIPTION OF THE DRAWINGS

FIGS. 2A-2C collectively illustrate example implementations of an array.

DETAILED DESCRIPTION

Figure 1:
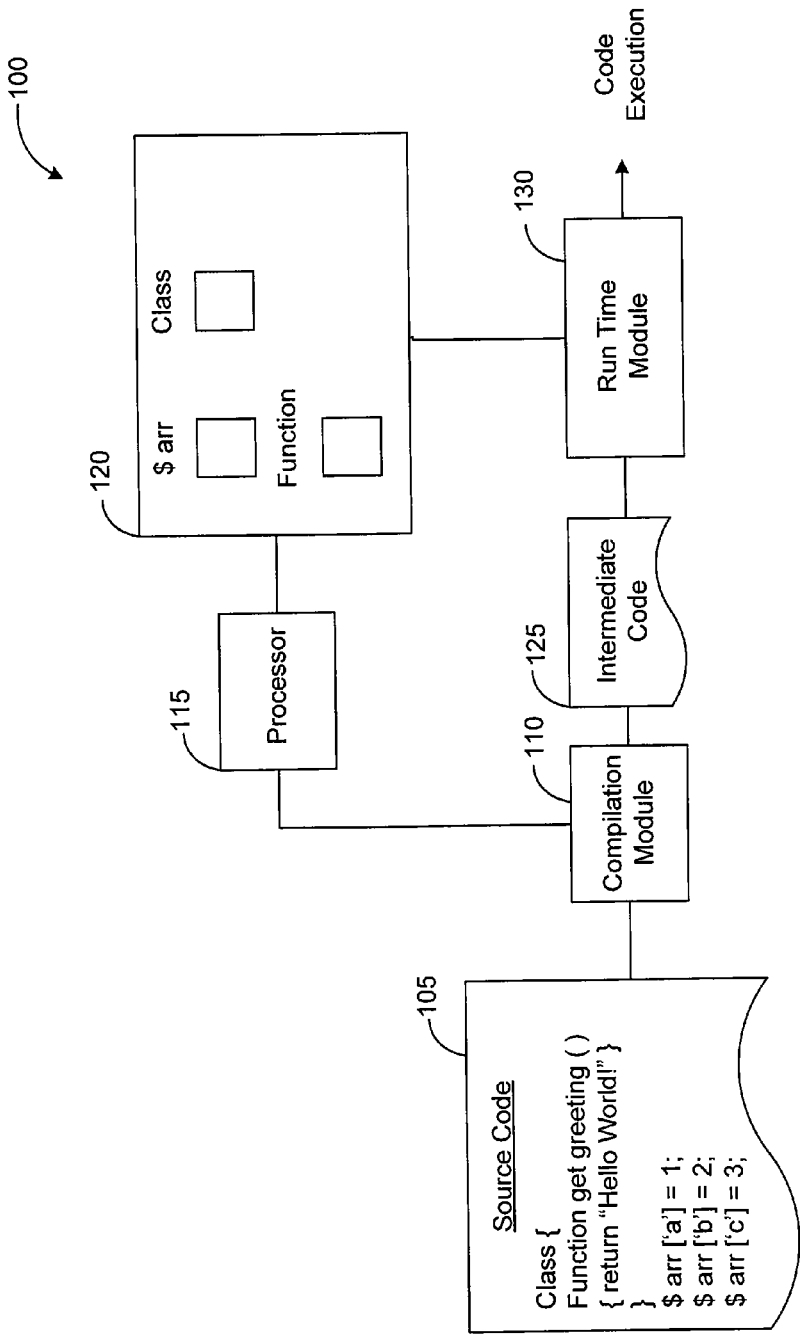
FIG. 1 is a distributed environment in which an embodiment of the invention may operate.

References in this description to "an embodiment", "one embodiment", or the like, mean that the particular feature, function, or characteristic being described is included in at least one embodiment of the present invention. Occurrences of such phrases in this specification do not necessarily all refer to the same embodiment, nor are they necessarily mutually exclusive.

Disclosed are a method and system for implementing an array data structure of a programming language using a plurality of implementations. The implementations provide an efficient way to retrieve elements from the array, especially to retrieve them in the order they were inserted into the array. The data structures also minimize the computing resources required to manage and access the array. The disclosed technique also selects one of the many implementations based on criteria including access pattern or size of the array.

In an embodiment, the array is a data type in a dynamic programming language, such as Personal Home Page (PHP). In other embodiments, the array could be part of other programming languages. The array stores data as key-value pairs, where a value is associated with a key of the key-value pair. Also, the key acts as an index of the array. In other embodiments, the array can store the data in other formats.

In a first implementation, the array is represented using a combination of a first data structure and a second data structure. The first data structure includes a plurality of contiguous memory buckets that store key-value pairs in the order in which the key-value pairs are inserted into the array. The second data structure includes a plurality of memory slots that store pointers that point to the buckets of the first data structure. Each of the slots corresponds to a key of the key-value pairs in the first data structure, and stores a pointer pointing to the bucket which has the value of the key. The key-value pairs may be retrieved in the order they are inserted by iterating through the first data structure. In an embodiment, the first data structure is an ordered container having contiguous blocks of memory, and the second data structure is a hashtable.

In a second implementation, the array is represented, again, using a combination of a first data structure and a second data structure. The first data structure includes a plurality of slots of the memory that store key-value pairs of the array. Each of the slots correspond to a key of the key-value pairs. The second data structure includes a plurality of contiguous buckets of the memory that store pointers pointing to the slots containing key-value pairs. Each of the pointers is associated with one of the key-value pairs. Further, the buckets store the pointers in the order in which the corresponding key-value pairs are inserted into the array. The key value pairs may be retrieved in the order they were inserted by iterating through the second data structure to obtain the pointers to the slots containing the key-value pairs and then obtaining the key-value pairs from the slots pointed to by the pointers. In an embodiment, the first data structure is a hashtable and the second data structure is an ordered container having contiguous blocks of memory.

FIG. 1 is a distributed environment 100 in which an embodiment of the invention may operate. The environment 100 includes a processor 115, a memory 120, a compilation module 110 and a runtime module 130. The compilation module 110 compiles source code 105 of a program to an intermediate code 125, and the runtime module 130 executes the intermediate code 125. The intermediate code 125 can be machine code or byte code, for example.

The source code 105 can be written using a programming language, such as PHP. In other embodiments, the source code 105 can be written using other programming languages. The source code 105 includes programming language constructs such as class, function, and data types such as array, etc. When the source code 105 is executed, the data types (and programming language constructs) are implemented, in the memory 120, using various data structures. The data structure used to implement a data type has a significant impact on the efficiency of the execution of the program. Further, a usage pattern and a property of the data type have to be considered for implementing the data type using a particular data structure. The array "arr" in the source code 105 may be accessed in various ways. For example, the array may be a read-only array, the values may be retrieved randomly, the values (or key-value pairs) may be retrieved in the order they were inserted, key-value pairs may be written into the array, the array may grow in size during the lifetime of the program, etc. Accordingly, the data structure used to implement the array is selected based at least on some of the above mentioned factors.

FIGS. 2A-2C illustrate example implementations of an array, according to an embodiment of the disclosed technique. The example implementations includes a first implementation 225 of FIG. 2B and a second implementation 250 of FIG. 2C. An array, such as array 205 of FIG. 2A, can be implemented using one or both of the example implementations. The example implementations may be implemented in an environment such as environment 100 of FIG. 1. The array 205 can be part of a source code, such as source code 105.

The array data structure implemented using first implementation 225, includes a data structure 230 that contains a plurality (n+1) of slots of memory, and another data structure 235 that contains a plurality (m+1) of contiguous buckets of memory. The data structure 230 can be, for example, a hashtable, and data structure 235 can be, for example, contiguous blocks of memory. (Henceforth, the data structure with a plurality of slots in the memory is referred to as "hashtable" and the data structure with a plurality of contiguous buckets of memory is referred to as "ordered container.") In other embodiments, the data structures 230 and 235 can be created using other similar data structures.

The buckets of the ordered container 235 store key-value pairs 210 of the array 205 in the order in which the key-value pairs 210 are inserted into the array 205. In an embodiment, the key or value or both may be pre-defined or dynamically computed. The slots of the hashtable 230 store pointers that point to the buckets containing the key-value pairs 210. Each of the slots in the hashtable 230 corresponds to one of the keys of the key-value pairs 210. When a key-value pair is inserted into the array 205, (a) a slot corresponding to the key is obtained from the hashtable 230, and (b) a bucket contiguous to the previously filled bucket is obtained from the ordered container 235. The key-value pair is stored in the retrieved bucket, and a pointer that points to the retrieved bucket is stored in the slot corresponding to the key.

For example, consider that a key-value pair of "a, 1" ("a" being the key and "1" being the value) is inserted into the array 205. Also, consider that the hashtable 230 and the ordered container 235 are null, or empty, that is, they do not contain any entries. When the key-value pair "a, 1" is inserted into the array 205, a bucket contiguous to previously filled bucket is obtained from the ordered container 235. Since there are no key-value pairs in the ordered container 235, "bucket 0" is retrieved. A slot corresponding to the key "a" is obtained from the hashtable 230. In an embodiment, the slot is obtained using a hash function, on the key "a", which evaluates the key to a number. Consider that the hash function evaluates "a" to "2." So, "slot 2" is obtained from the hashtable 230. After obtaining the "bucket 0" and "slot 2", the key-value pair "a,1" is stored in "bucket 0" and pointer to the "bucket 0" is stored in "slot 2."

Similarly, when a subsequent key-value pair such as "b, 2" is inserted into the array 205, a bucket contiguous to the previously filled bucket, that is, "bucket 1" (which is adjacent to the previously filled bucket "bucket 0") is obtained from the ordered container 235, and a slot, "slot 0" which corresponds to the key "b" is obtained from the hash table 210. The key-value pair "b, 2" is stored in "bucket 1" and a pointer to the "bucket 1" is stored in "slot 0." Accordingly, when subsequent key-value pairs are inserted into the array 205, the key-value pairs 210 are stored in the ordered container 235 in the order they are inserted into the array 205. In an embodiment, the slots of the hashtable 230 and the buckets of ordered container 235 may be allotted as and when the key-value pairs are added to the array.

Having a separate data structure, such as the ordered container 235, to store the key-value pairs 210 in the order they are inserted into the array enables the applications to retrieve them in the order they are inserted more efficiently and without having any additional logic. In an embodiment, retrieving key-value pairs in the order they are inserted into an array from a data structure that stores them in the order they are inserted is more efficient than retrieving from the data structures that do not store them in the order they are inserted.

In the second implementation 250 of FIG. 2B, the key-value pairs 210 are stored in slots of hashtable 255, and pointers to the slots are stored in the ordered container 260. One of the differences between the two example implementations 200 is that, the second implementation 250 stores the pointers in the order of the key-value pairs they point to are inserted into the array, whereas the first implementation 225 stores the key-value pairs in the order they were inserted into the array.

Consider that the hashtable 255 and ordered container 260 have no entries. When a key-value pair, such as "a, 1" is inserted into the array 205, a slot corresponding to the key "a" is obtained from the hashtable 255. Consider that a hash function evaluates "a" to "3." So, "slot 3" is obtained from the hashtable 255. A bucket that is contiguous to the previously filled bucket, that is, "bucket 0" (since there are no entries in the ordered container 260) is obtained. The key-value pair "a, 1" is inserted into "slot 3" of the hashtable 255 and a pointer to "slot 3" is stored in the "bucket 0" of the ordered container 260. Accordingly, when subsequent key-value pairs are added to the array 205, the key-value pairs are hashed into corresponding slots of the hashtable 255, and pointers pointing to the key-value pairs are stored in the ordered container 260 in the order in which the key-value pairs are inserted into the array.

The first implementation 225 and the second implementation 250 provide different benefits in different scenarios. For example, in a scenario where the key-value pairs 210 are often retrieved in the order they are inserted, using the first implementation 225 may be beneficial since the values may be obtained by iterating the ordered container 235. However, if the values in the array 205 are accessed on a random basis, for example, by performing a look-up using a key, at least two reads may be performed to retrieve the value. That is, a first read to obtain the slot corresponding to the key and a second read to obtain the key-value pair from the bucket pointed to by the pointer in the slot. Accordingly, first implementation may consume more computing resources in scenarios where values are often retrieved on random basis than in the order they were inserted into the array 205.

In the second implementation 250, a value of a key may obtained in a single read, for example, by performing a look-up in the hashtable 255 using the key. Accordingly, the second implementation 250 provides a benefit over the first implementation 225 in scenarios where the values are accessed randomly often. However, in scenarios where the values are often retrieved in the order they are inserted, the second implementation 250 performs at least two reads—a first read to obtain the pointer from the ordered store 260 and a second read to obtain the key-value pair from the slot pointed to by the pointer. Accordingly, the second implementation 250 may not be as efficient compared to the first implementation 225 in scenarios where the values are retrieved in the order they were inserted.

Figure 3:
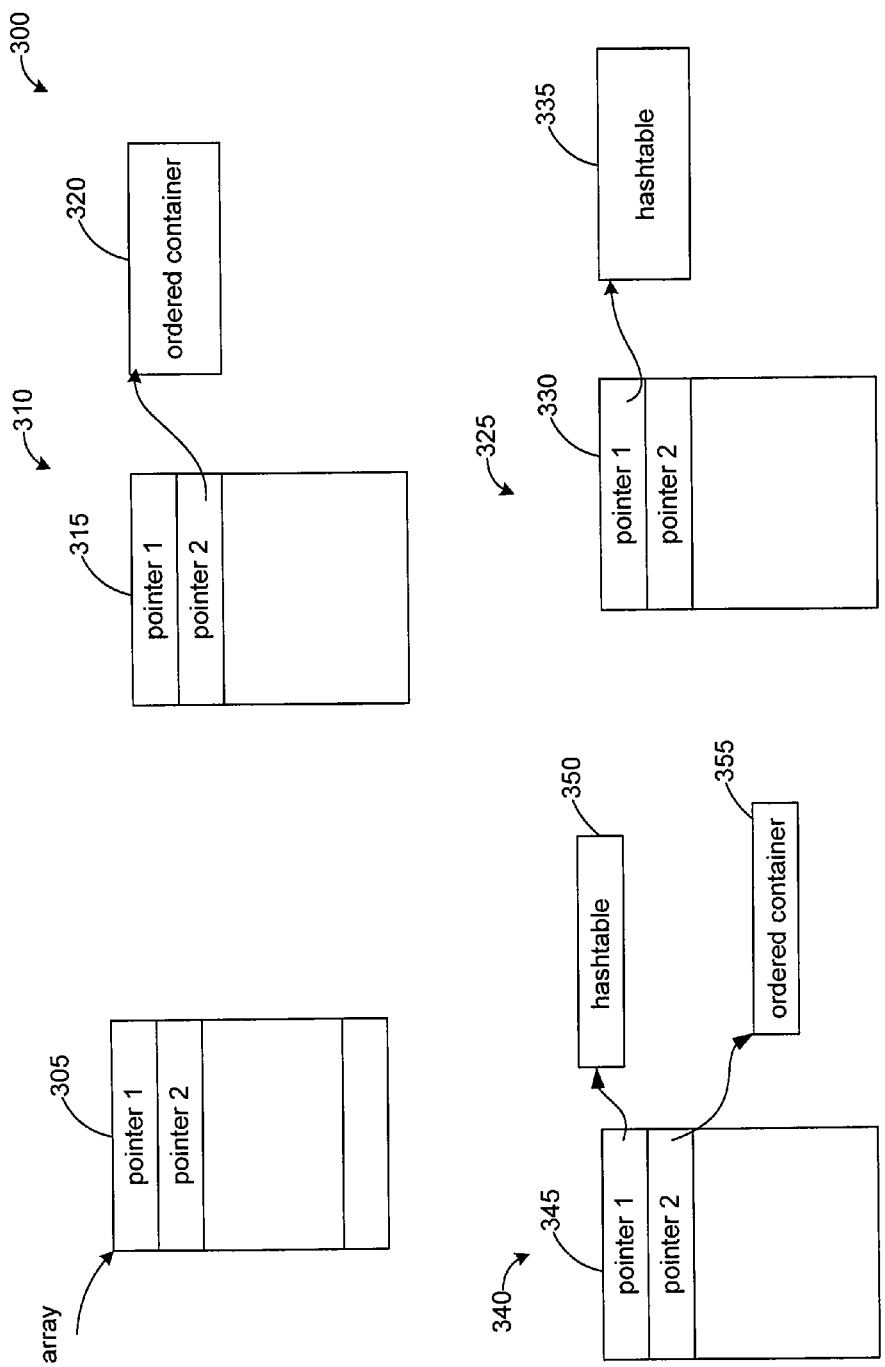
FIG. 3 is a block diagram illustrating allocation of memory for an array data structure.

FIG. 3 is a block diagram illustrating allocation of memory for an array data structure, according to an embodiment of the disclosed technique. Memory environment 300 illustrates allocating memory for an array data structure implementing an array, such as array 205 of FIG. 2. In an embodiment, the memory may be similar to the memory 120 of environment 100 of FIG. 1. In the first implementation 225, the array data structure for the array 205 "arr" is implemented using a combination of the hashtable 230 and the ordered container 235. The array data structure is allocated a block of memory.

In a first configuration 305, the block allotted for the array data structure can contain both the hashtable 230 and the ordered container 235 in the same block. The array data structure has a first pointer "pointer 1" that points to the hashtable 230 in the block, and a second pointer "pointer 2" that points to the ordered container 235 in the block. In an embodiment, the pointers stored in the slots of hashtable 230 can be an offset to a bucket the pointer points to. The offset can be represented using lesser number of bits than a pointer and thus, reduces the memory space consumed.

In a second configuration 310, the block 315 allotted for the array data structure includes the hashtable 230 in the same block, but the ordered container 235 is allocated a different block 320. The first pointer "pointer 1" points to the hashtable 230 in the block 315, and a second pointer "pointer 2" points to the ordered container 235 in the block 320. In an embodiment, the pointer stored in the slot of hashtable 230 can be an offset of a bucket the pointer points to. The offset can be represented using lesser number of bits than a pointer, which reduces the consumption of memory space.

In a third configuration 325, the block 330 allotted for the array data structure includes the ordered container 235 in the same block, but the hashtable 230 is allocated a different block 335. The first pointer "pointer 1" points to the hashtable 230 in the block 335, and a second pointer "pointer 2" points to the ordered container 235 in the block 330.

In a fourth configuration 340, both the hashtable 230 and the ordered container 235 are allocated different blocks and outside of the block 345 allotted for the array data structure. The first pointer "pointer 1" points to the hashtable 230 in the block 350, and a second pointer "pointer 2" points to the ordered container 235 in the block 355.

In an embodiment, a particular configuration is chosen based on various factors including, architecture of a computer system the program is executing in, memory allocation techniques of the operating system of the computer system, a size of the array 205, whether size of the array 205 changes or remains the same during the execution of the program, etc.

Figure 4:
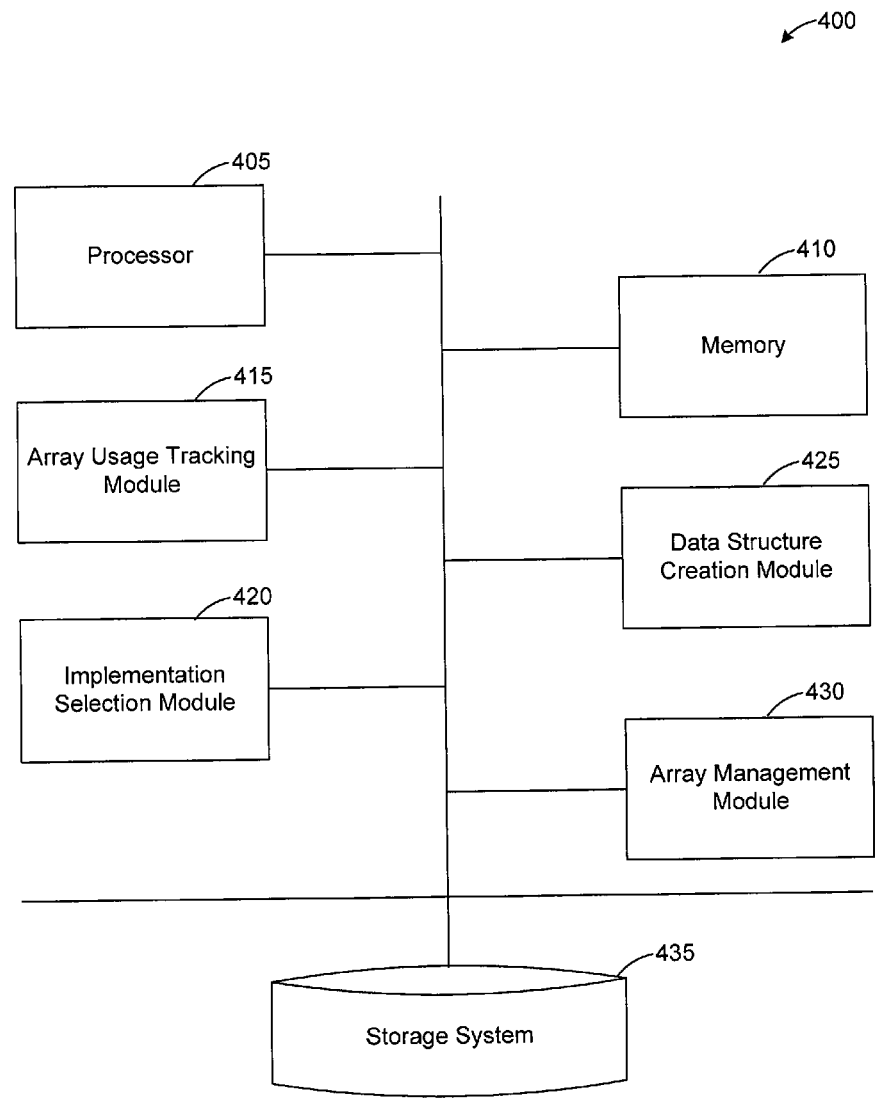
FIG. 4 is a block diagram of a system for implementing an array using one of a plurality of implementations, according to an embodiment of the disclosed technique.

FIG. 4 is a block diagram of a system 400 for implementing an array using one of a plurality of implementations, according to an embodiment of the disclosed technique. The system 400 can be in an environment such as environment 100 of FIG. 1. The specific implementation can be similar to a first implementation 225 or a second implementation 250 of FIGS. 2B and 2C, respectively. The system 400 includes a processor 405, a memory 410, array usage tracking module 415, an implementation selection module 420, a data structure creation module 425, an array management module 430 and a storage system 435 that contains details regarding array usage pattern. Each of the modules co-ordinate with the processor 405 to create and manage the array data structure. Of course, in some embodiments arrays could be implemented during execution according to an indicated implementation, depending on the desired application.

The implementation selection module 415 selects at least one of the first implementation 225 and the second implementation 250 based on criteria including (i) array usage pattern, or (ii) size of an array. The array tracking module 415 tracks the array usage pattern or size of the array during the execution of a program containing the array. The array tracking module 415 generates a report containing information regarding the usage of the array, and stores the report in the storage system 435, such as a database. The array usage pattern that is tracked can include at least one of (i) whether the array elements are often read in random order, (ii) whether the array elements are often read in the order they are inserted into the array, (iii) a number of elements/number of times an element is read from the array, (iv) whether the array is a read only array, (v) whether a size of the array changes (increases/decreases) during the lifetime of the array, etc.

In an embodiment, the implementation selection module 415 selects the first implementation 225 if a frequency of reading the elements of the array in the order they are inserted exceeds a predefined threshold. The implementation selection module 415 selects the second implementation 250 if at least one of (i) a frequency of reading the elements of the array in a random order exceeds a predefined threshold, (ii) the number of elements or number of times an element is read from the array exceeds a predefined threshold, or (iii) the size of the array increases beyond a predefined threshold etc.

The memory allocation configuration for the array data structure can include one of the four memory allocation configurations of FIG. 3. In an embodiment, the size of the array helps in determining a particular memory allocation configuration for the array data structure. For example, if the size of the array increases continuously, the second configuration 310 may be selected in case of the first implementation 225 or the third configuration 325 may be selected for second implementation 250.

In an embodiment, the access pattern of the array and the size of the array can be tracked using a script that is executed along with the program containing the array. The script can generate a report containing the details of the array access pattern and the size of the array. Further, the access pattern may be tracked for a predefined number of executions of the program to determine the access pattern of the array more accurately.

After one of the first implementation 225 and the second implementation 250 is selected by the implementation selection module 420, the data structure creation module 425 creates the array data structure in the memory 410 based on the selected implementation. The array management module 430 provides or co-ordinates the read/write access to the array data structure in the memory 410.

The array data structure created using either of the first implementation 225 or the second implementation 250 supports collision resolution. A collision may result when two or more keys hash to a single slot in the hashtable. The collision resolution techniques determine a free slot in which the key-value pair may be stored. The collision resolution techniques include chaining, and probing techniques such as linear probing, quadratic probing, cuckoo hashing, double hashing, etc.

Figure 5:
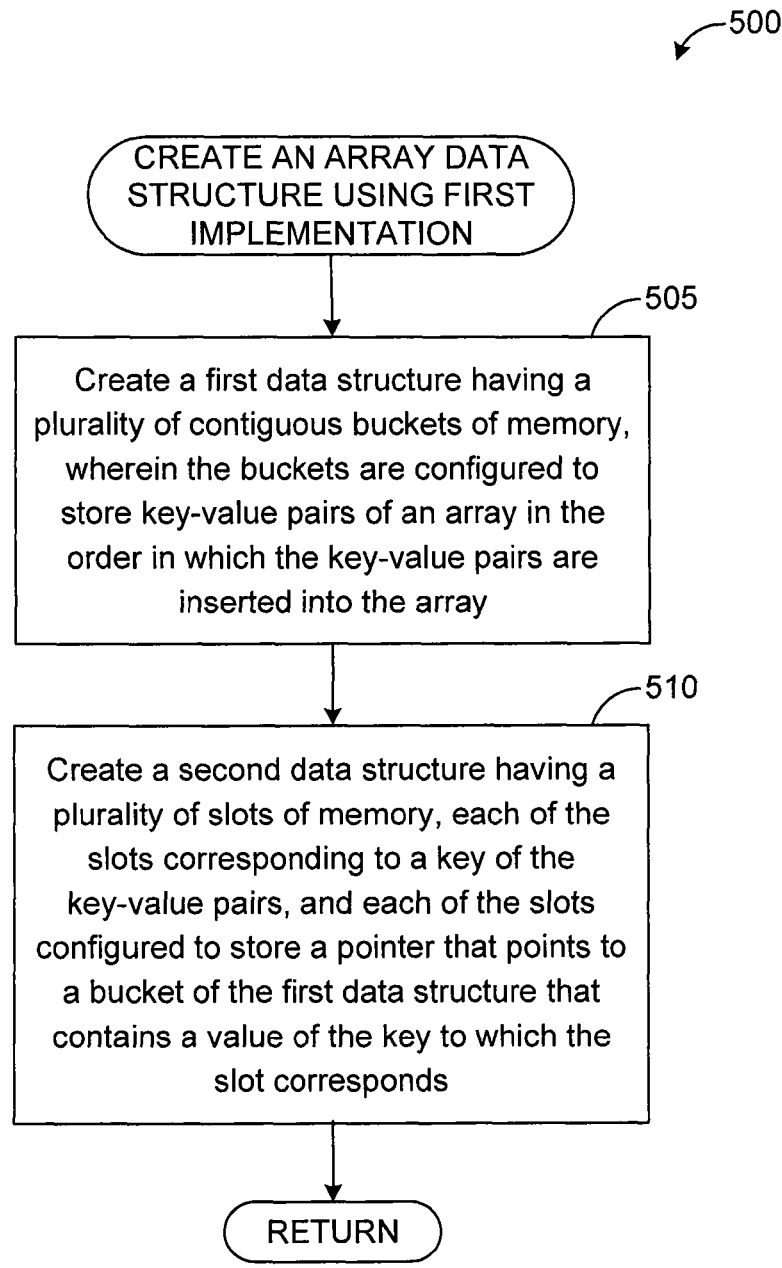
FIG. 5 illustrates a process of implementing an array data structure for an array using a first implementation.

FIG. 5 illustrates a process 500 of implementing an array data structure for an array using a first implementation, according to an embodiment of the disclosed technique. The process 500 may be executed in an system such as system 400 of FIG. 4. The first implementation can be similar to the first implementation 225 of FIG. 2. At step 505, the data structure creation module 425 creates a first data structure having a plurality of contiguous buckets of a memory (also referred to as "ordered container"). The buckets in the ordered container are configured to store the key-value pairs of the array in the order the key-value pairs are inserted into the array. For example, the first bucket contains the first key-value pair inserted into the array, the second bucket contains the second key-value pair inserted into the array and so forth.

At step 510, the data structure creation module 425 creates a second data structure having a plurality of slots of memory (also referred to as "hashtable"). Each of the slots corresponds to one of the keys of the key-value pairs in the ordered container, and stores a pointer to the bucket that contains a value of the key to which the slot corresponds. In an embodiment, a slot corresponding to a key may be determined using a hash function on the key.

Figure 6:
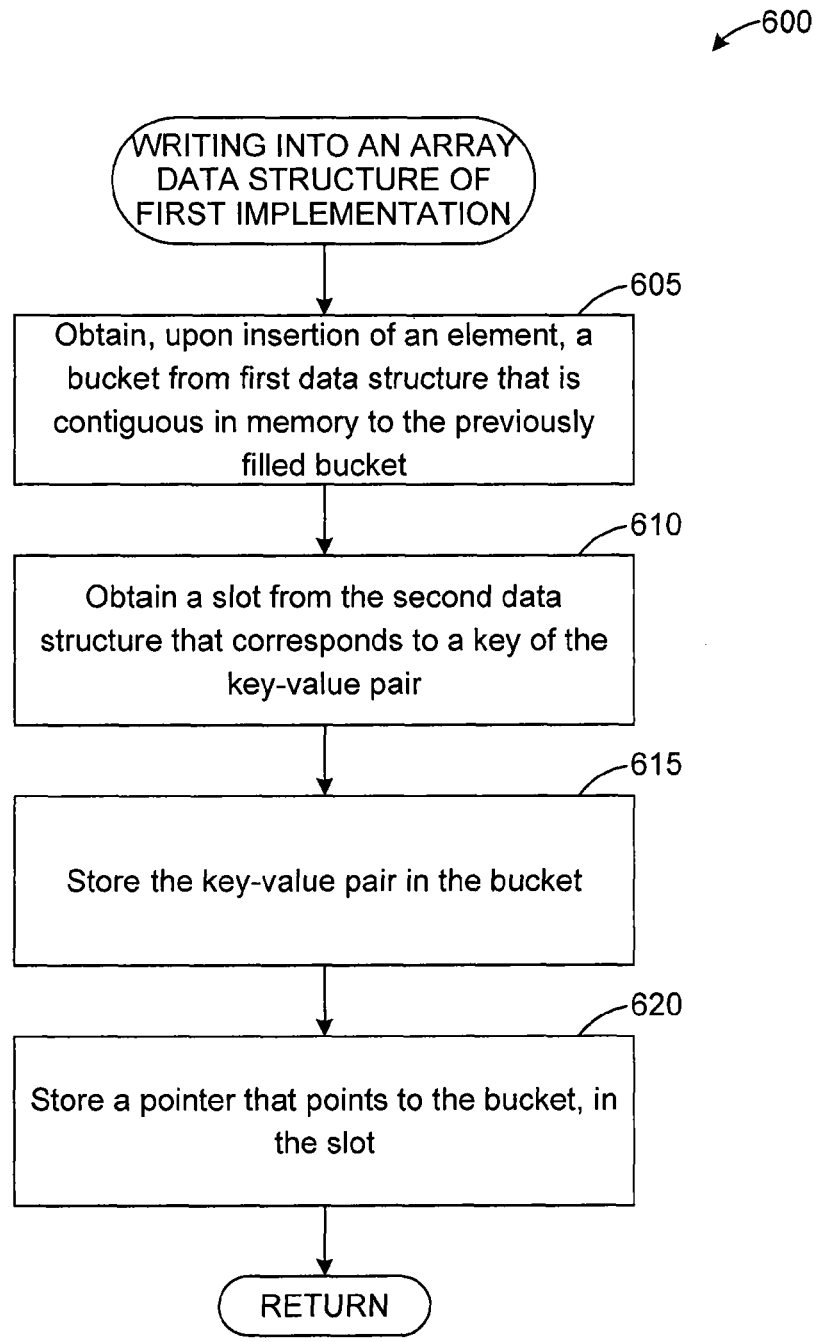
FIG. 6 is a flow diagram of a process for writing a key-value pair of the array into the array data structure implemented using the first implementation.

FIG. 6 is a flow diagram of a process 600 for writing a key-value pair of an array into the array data structure implemented using the first implementation, according to an embodiment of the disclosed technique. The process 600 may be executed in a system such as system 400 of FIG. 4, and using the array data structure created using process 500 of FIG. 5. At step 605, upon insertion of a key-value pair into the array, the array management module 430 obtains a bucket from the ordered container which is contiguous to the previously filled bucket. At step 610, the array management module 430 obtains a slot from the hashtable which corresponds to the key of the key-value pair inserted into the array. At step 615, the array management module 430 stores the key-value pair in the bucket. At step 620, the array management module 430 stores a pointer that points to the bucket, in the slot.

Figure 7:
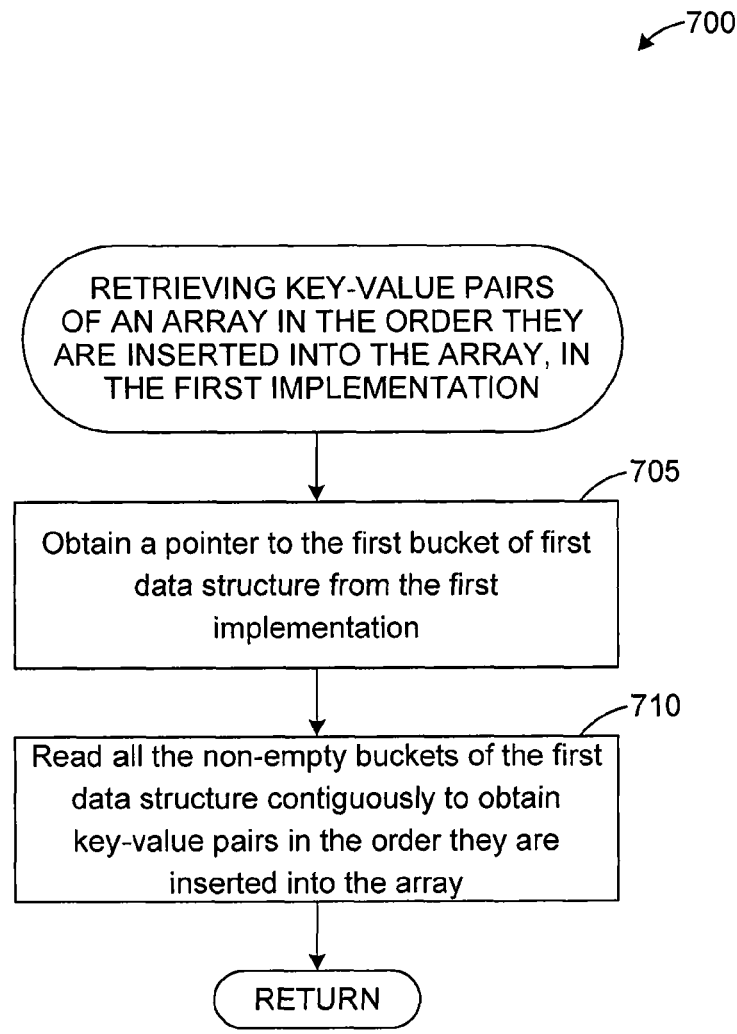
FIG. 7 is a flow diagram of a process for retrieving key-value pairs of the array in the order they are inserted, in the first implementation.

FIG. 7 is a flow diagram of a process 700 for retrieving key-value pairs of an array in the order they are inserted, in the first implementation, according to an embodiment of the disclosed technique. The process 700 may be executed in a system such as system 400 of FIG. 4, and using an array data structure created using process 500 of FIG. 5. As described in FIG. 3, the array data structure includes both the ordered container and the hashtable. The array data structure includes pointers to the hashtable and the ordered container.

At step 705, the array management module 430 obtains a pointer to the first bucket of the ordered container. At step 710, the array management module 430 iterates over the nonempty contiguous buckets of the ordered container to retrieve the key-value pairs in the order they are inserted.

Figure 8:
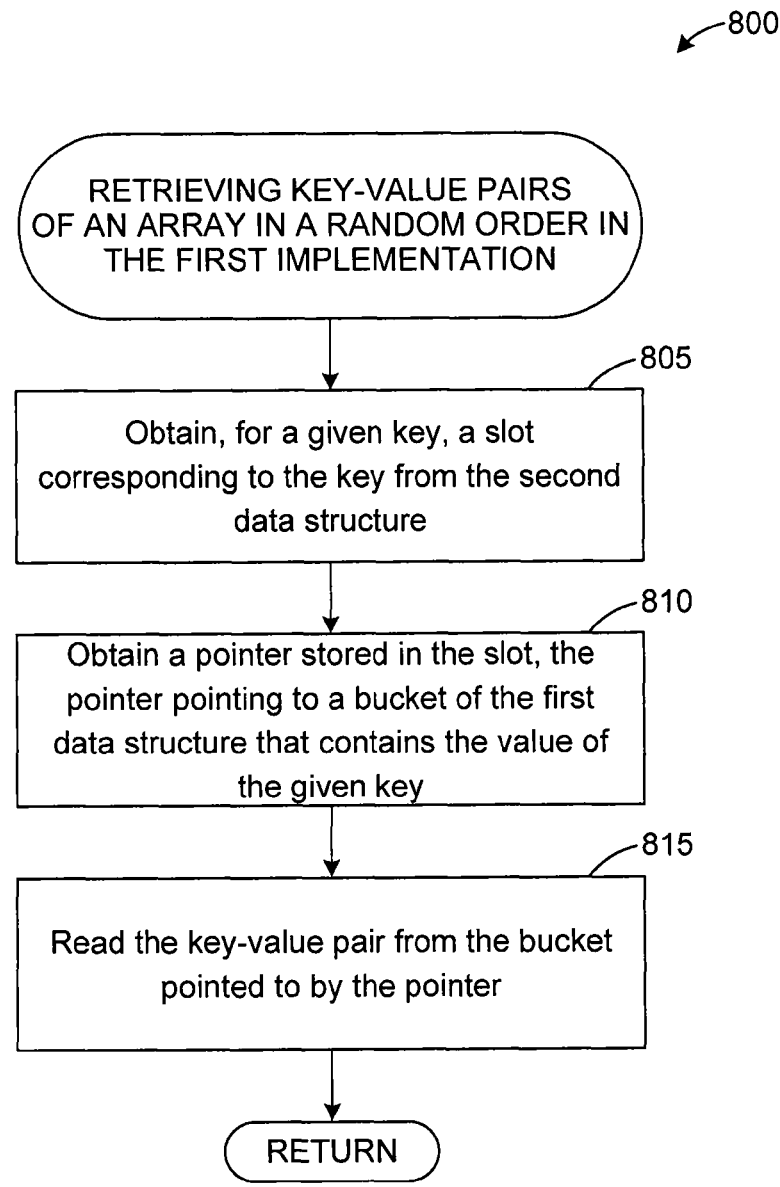
FIG. 8 is a flow diagram of a process for retrieving key-value pairs of the array in a random order in the first implementation.

FIG. 8 is a flow diagram of a process 800 for retrieving key-value pairs of an array in a random order, in the first implementation, according to an embodiment of the disclosed technique. The process 800 may be executed in a system such as system 400 of FIG. 4, and using an array data structure created using process 500 of FIG. 5. At step 805, the array management module 430 obtains a slot of the hashtable corresponding to a specified key for which the value has to be obtained. In an embodiment, the array management module 430 obtains the corresponding slot by using a hash function on the key. At step 810, the array management module 430 obtains a pointer stored in the slot. The pointer points to a bucket in the ordered container which has the value (or key-value pair) of the key to which the slot corresponds. At step 815, the array management module 430 reads the key-value pair from the bucket pointed to by the pointer.

Figure 9:
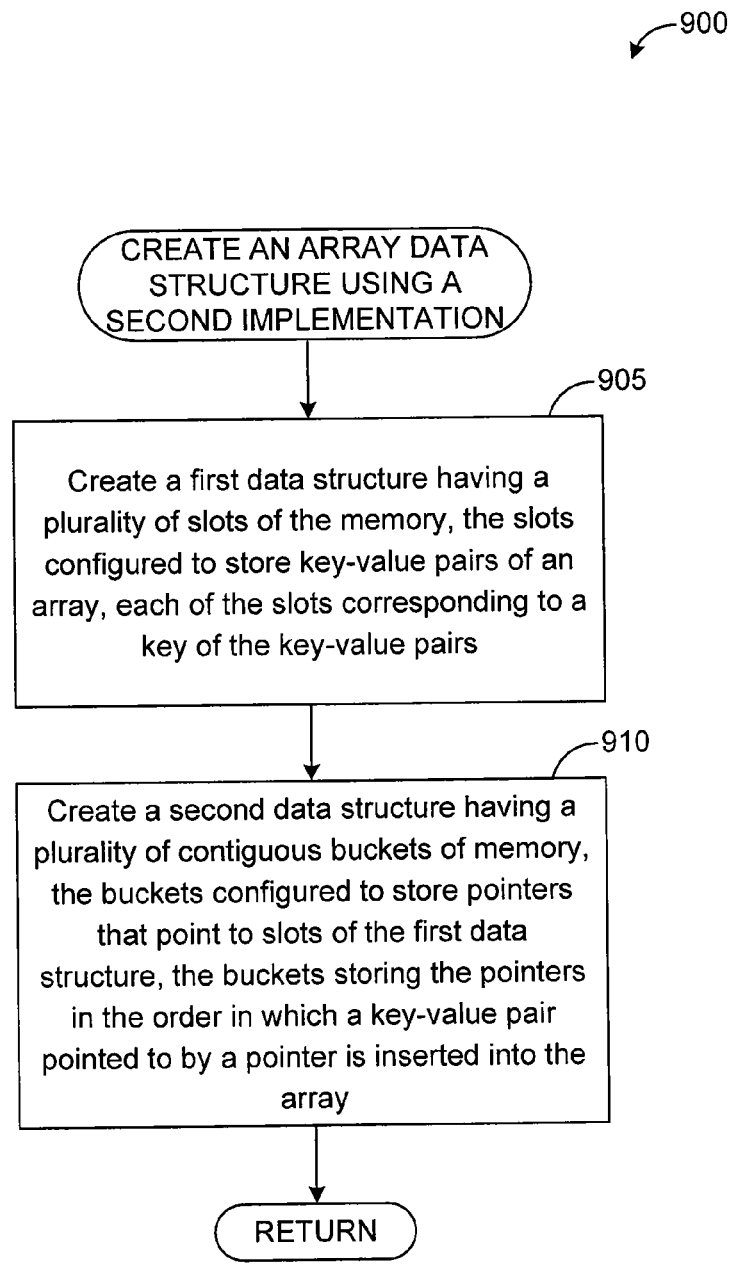
FIG. 9 illustrates a process of implementing an array data structure for an array using a second implementation.

FIG. 9 illustrates a process 900 of implementing an array data structure for an array using a second implementation, according to an embodiment of the disclosed technique. The process 900 may be executed in an system such as system 400 of FIG. 4. The second implementation can be similar to the second implementation 250 of FIG. 2. At step 905, the data structure creation module 425, creates a hashtable having a plurality of slots. Each of the slots of the hashtable is configured to store one of a plurality of key-value pairs of an array. Each of the slots corresponds to one of the keys of the key-value pairs. In an embodiment, a slot corresponding to a key may be determined using a hash function on the key.

At step 910, the data structure creation module 425 creates an ordered container having a plurality of contiguous buckets of a memory. Each of the buckets in the ordered container is configured to store a pointer that points to one of the slots of the hashtable. Further, the buckets are configured to store the pointers in the order in which a key-value pair pointed to by a pointer is inserted into the array. For example, the first bucket contains a pointer to the slot containing the first key-value pair inserted into the array, the second bucket contains a pointer to the slot containing the second key-value pair inserted into the array and so forth.

Figure 10:
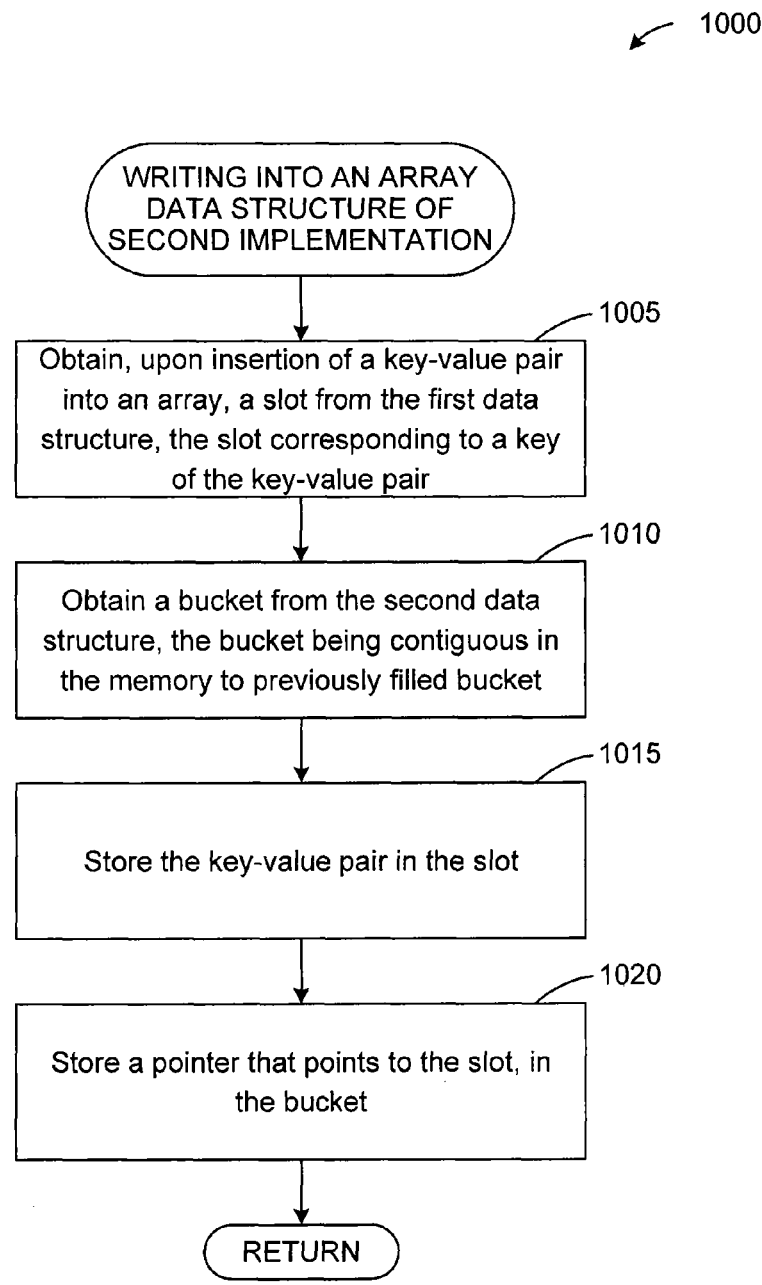
FIG. 10 is a flow diagram of a process for writing a key-value pair of the array into the array data structure implemented using the second implementation.

FIG. 10 is a flow diagram of a process 1000 for writing a key-value pair of an array into the array implemented using the second implementation, according to an embodiment of the disclosed technique. The process 1000 may be executed in a system such as system 400 of FIG. 4, and using an array data structure created using process 900 of FIG. 9. At step 1005, upon insertion of a key-value pair into the array, the array management module 430 obtains a slot from the hashtable of the array data structure. The slot corresponds to a key of the inserted key-value pair. At step 1010, the array management module 430 obtains a bucket which is contiguous to a previously filled bucket from the ordered container. At step 1015, the key-value pair is stored in the slot of the hashtable. At step 1020, a pointer to the slot is stored in the bucket of the ordered container.

Figure 11:
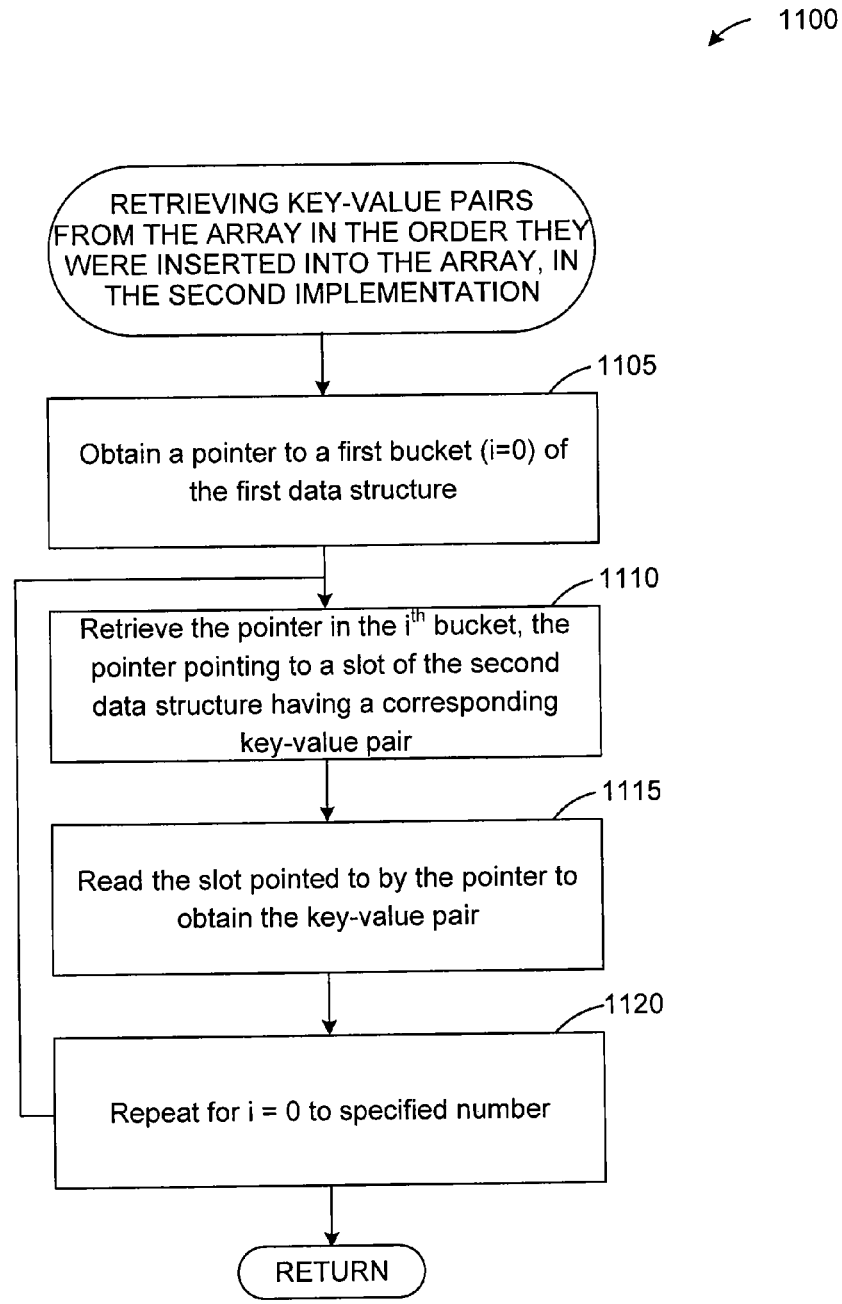
FIG. 11 is a flow diagram of a process for retrieving key-value pairs of the array in the order they are inserted, in the second implementation.

FIG. 11 is a flow diagram of a process 1100 for retrieving key-value pairs of an array in the order they are inserted, using the second implementation, according to an embodiment of the disclosed technique. The process 1100 may be executed in a system such as system 400 of FIG. 4, and using an array data structure created using process 900 of FIG. 9. As described in FIG. 3, the array data structure includes pointers to the hashtable and the ordered container.

At step 1105, the array management module 430 obtains a pointer to the first bucket (i=0) of the ordered container. At step 1110, the array management module 430 retrieves a pointer stored in the $i^{th}$ bucket. The pointer points to a slot of the hashtable which contains $i^{th}$ key-value pair inserted into the array. (For example, i=0 indicates the first key value pair inserted into the array, i=1 indicates the second value inserted into the array and so forth.) At step 1115, the array management module 430 retrieves the key-value pair stored in the slot pointed to by the pointer. At step 1120, the array management module 430 determines whether specified number of key-value pairs are retrieved. Responsive to a determination that the specified number of key-value pairs are retrieved, the process 1100 returns. On the other hand, responsive to a determination that the specified number of key-value pairs are not retrieved, the control is transferred to step 1110, and the array management module 430 iterates over remaining buckets of the ordered container until the specified number of key-value pairs are retrieved. In an embodiment, all key-value pairs of the array may be retrieved.

Figure 12:
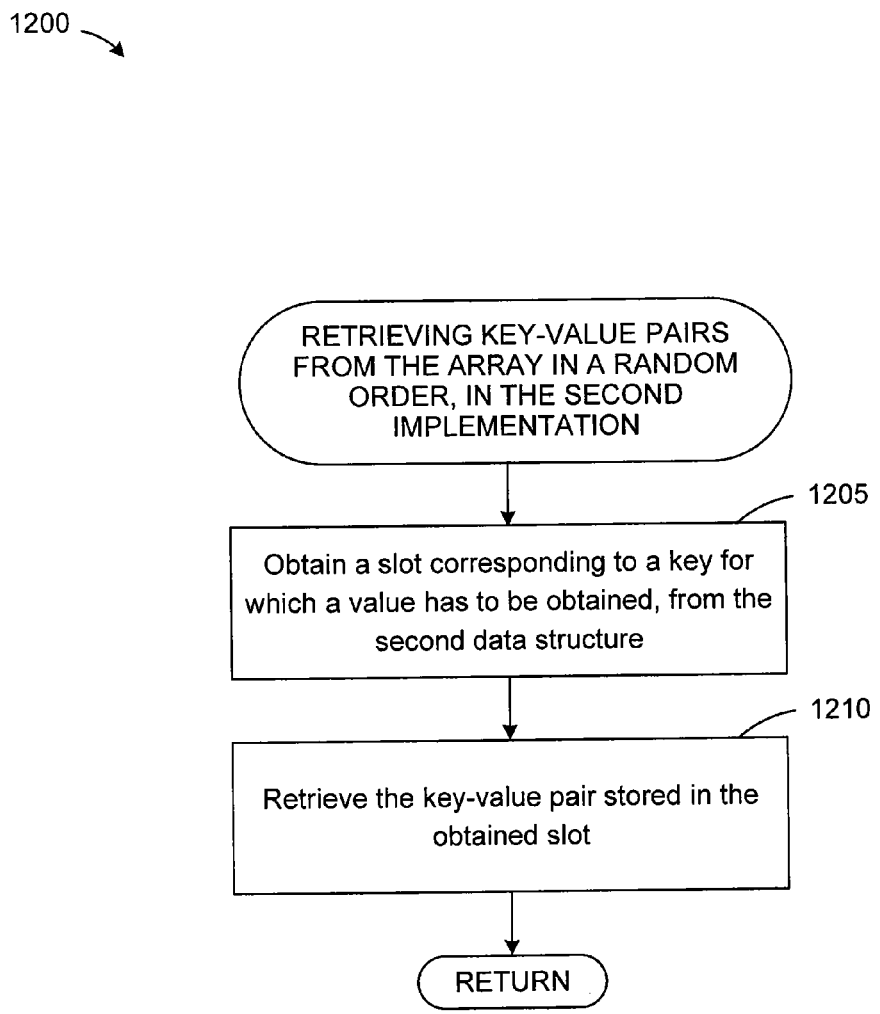
FIG. 12 is a flow diagram of a process for retrieving key-value pairs of the array in a random order, in the second implementation.

FIG. 12 is a flow diagram of a process 1200 for retrieving key-value pairs of an array in a random order, using the second implementation, according to an embodiment of the disclosed technique. The process 1200 may be executed in a system such as system 400 of FIG. 4, and using an array data structure creating using process 900 of FIG. 9. At step 1205, the array management module 430 obtains a slot of the hashtable corresponding to a specified key for which the value has to be obtained. In an embodiment, the array management module 430 obtains the corresponding slot by using a hash function on the key. At step 1210, the array management module 430 retrieves the key-value pair stored in the slot of the hashtable.

Figure 13:
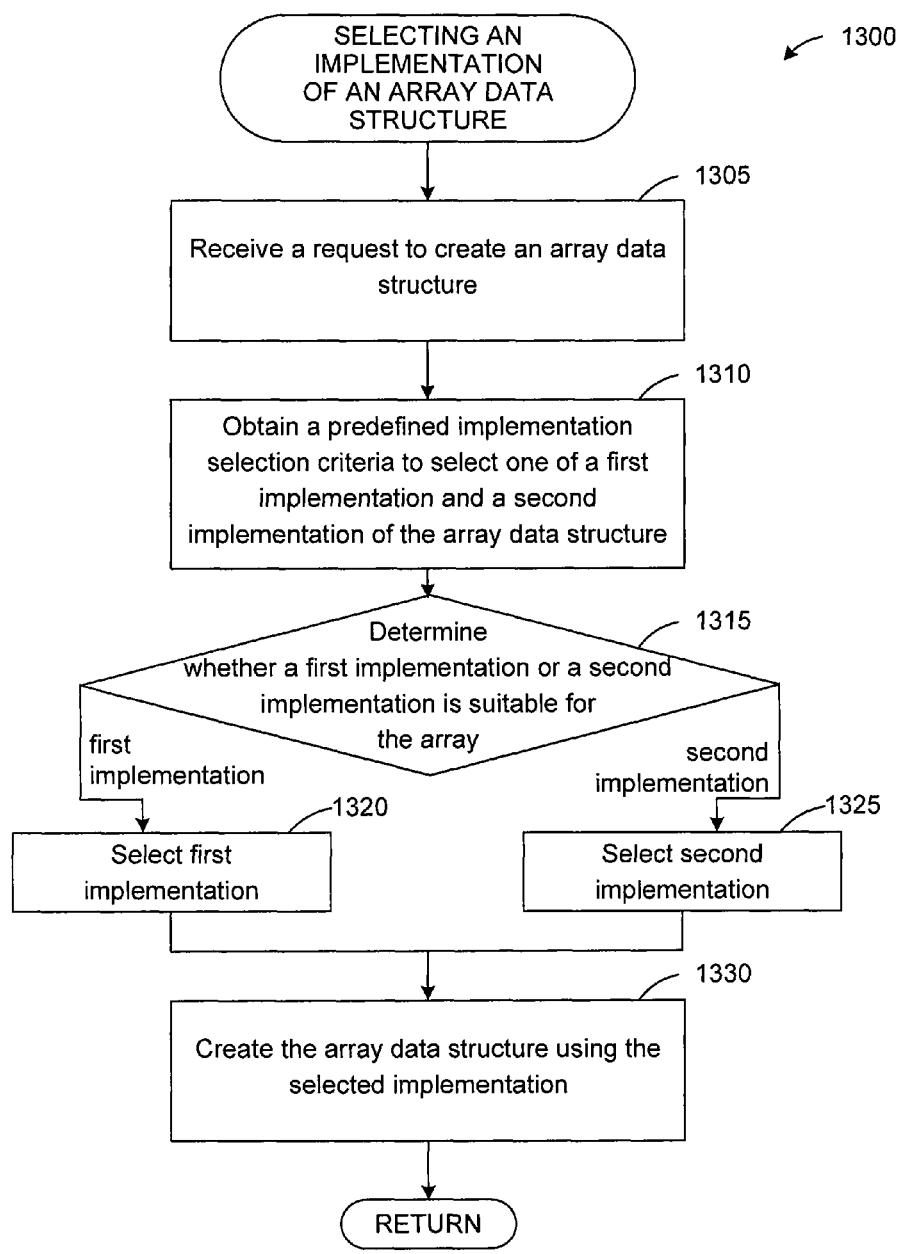
FIG. 13 is a flow diagram of a process for selecting one of a plurality of implementations to implement an array data structure for an array.

FIG. 13 is a flow diagram of a process 1300 for selecting one of a plurality of implementations to implement a data structure of an array, according to an embodiment of the disclosed technique. The process 1300 may be executed in a system such as system 400 of FIG. 4. At step 1305, the data structure creation module 425 receives a request to create an array data structure for an array of a program. At step 1310, the array usage tracking module 415 retrieves predefined implementation selection criteria for selecting an implementation from the storage system 435. The predefined implementation selection criteria include at least one of (a) array usage pattern, or (b) the size of the array. At determination step 1315, the implementation module 420 determines whether a first implementation or a second implementation is suitable for the array based on the implementation selection criteria. At step 1320, responsive to a determination that the first implementation is suitable, the first implementation is selected. On the other hand, responsive to a determination that the second implementation is suitable, at step 1325, the second implementation is selected. At step 1330, the data structure creation module 425 creates the array data structure based on the selected implementation.

Figure 14:
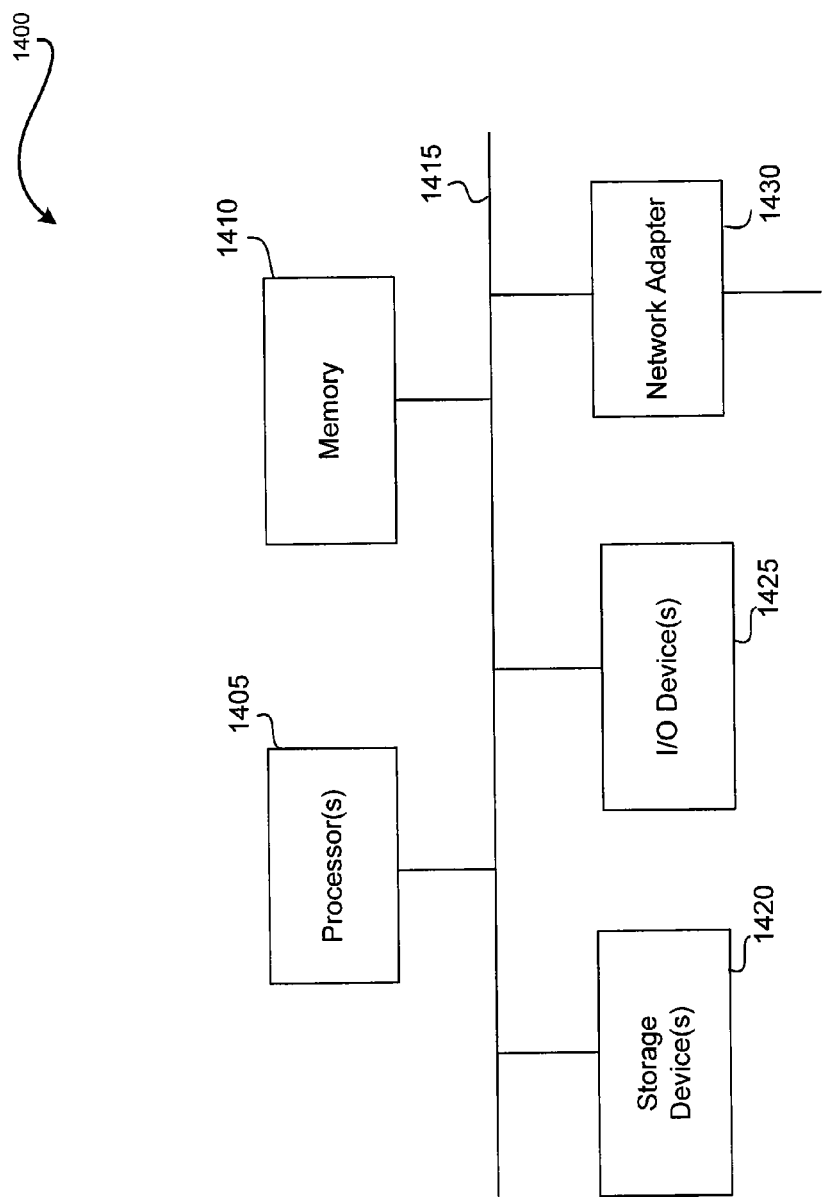
FIG. 14 is a block diagram of an apparatus that may perform various operations, and store various information generated and/or used by such operations.

FIG. 14 is a block diagram of an apparatus that may perform various operations, and store various information generated and/or used by such operations, according to an embodiment of the disclosed technique. The apparatus can represent any computer or processing system described herein. The processing system 1400 is a hardware device on which any of the entities, components or services depicted in the examples of FIGS. 1-13 (and any other components described in this specification) can be implemented, such as a compilation module, runtime module, memory, BLOB, implementation selection module, array usage tracking module, data structure creation module, storage system, etc. The processing system 1400 includes one or more processors 1405 and memory 1410 coupled to an interconnect 1415. The interconnect 1415 is shown in FIG. 14 as an abstraction that represents any one or more separate physical buses, point to point connections, or both connected by appropriate bridges, adapters, or controllers. The interconnect 1415, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 1405 is/are the central processing unit (CPU) of the processing system 1400 and, thus, control the overall operation of the processing system 1400. In certain embodiments, the processor(s) 1405 accomplish this by executing software or firmware stored in memory 1410. The processor(s) 1405 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 1410 is or includes the main memory of the processing system 1400. The memory 1410 represents any form of random access memory (RAM), read-only memory (ROM), flash memory, or the like, or a combination of such devices. In use, the memory 1410 may contain a code. In one embodiment, the code includes a general programming module configured to recognize the general-purpose program received via the computer bus interface, and prepare the general-purpose program for execution at the processor. In another embodiment, the general programming module may be implemented using hardware circuitry such as ASICs, PLDs, or field-programmable gate arrays (FPGAs).

Also connected to the processor(s) 1405 through the interconnect 1415 are a network adapter 1430, a storage device(s) 1420 and I/O device(s) 1425. The network adapter 1430 provides the processing system 1400 with the ability to communicate with remote devices, over a network and may be, for example, an Ethernet adapter or Fibre Channel adapter. The network adapter 1430 may also provide the processing system 1400 with the ability to communicate with other computers within the cluster. In some embodiments, the processing system 1400 may use more than one network adapter to deal with the communications within and outside of the cluster separately.

The I/O device(s) 1425 can include, for example, a keyboard, a mouse or other pointing device, disk drives, printers, a scanner, and other input and/or output devices, including a display device. The display device can include, for example, a cathode ray tube (CRT), liquid crystal display (LCD), or some other applicable known or convenient display device.

The code stored in memory 1410 can be implemented as software and/or firmware to program the processor(s) 1405 to carry out actions described above. In certain embodiments, such software or firmware may be initially provided to the processing system 1400 by downloading it from a remote system through the processing system 1400 (e.g., via network adapter 1430).

The techniques introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine.

A machine can also be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

A machine-accessible storage medium or a storage device(s) 1420 includes, for example, recordable/non-recordable media (e.g., ROM; RAM; magnetic disk storage media; optical storage media; flash memory devices; etc.), etc., or any combination thereof. The storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

The term "logic", as used herein, can include, for example, programmable circuitry programmed with specific software and/or firmware, special-purpose hardwired circuitry, or a combination thereof.

What is claimed is:

1. A method comprising:
    creating, in a memory of a computer system, a first data structure having a plurality of contiguous buckets of the memory, the buckets configured to store key-value pairs in the order in which the key-value pairs are inserted into an array;
    creating, in the memory of the computer system, a second data structure having a plurality of slots of the memory, each of the slots corresponding to a particular key of the key-value pairs, each of the slots configured to store a pointer that points to a bucket of the first data structure containing a value of a key to which the slot corresponds, wherein the first data structure and the second data structure are different data structures, wherein the first data structure and the second data structure together form a combined data structure that represents the array, and wherein the combined data structure includes a first pointer to the first data structure and a second pointer to the second data structures;
    obtaining, upon insertion of a new key-value pair into the array,
        a new bucket from the first data structure, the new bucket being contiguous in the memory to a previously filled bucket, and
        a new slot from the second data structure, the new slot corresponding to a new key of the new key-value pair;
    storing, in the new bucket, the new key-value pair; and
    storing, in the new slot, a new pointer that points to the new bucket.

2. The method of claim 1, wherein the second data structure is a hashtable.

3. The method of claim 2, wherein obtaining, from the second data structure, the new slot corresponding to the new key includes obtaining the new slot by using a hash function on the new key.

4. The method of claim 1, wherein the new pointer that points to the new bucket includes an offset of the new bucket in the first data structure.

5. The method of claim 1, wherein the pointer that points to the bucket of the first data structure is an offset of the bucket in the first data structure.

6. The method of claim 1 further comprising:
reading the buckets of the first data structure contiguously to obtain the key-value pairs in the order the key-value pairs are inserted into the array.

7. The method of claim 1, wherein the first data structure and the second data structure are created in a single contiguous block of the memory.

8. The method of claim 1, wherein at least one of the first data structure or the second data structure are created in separate blocks of the memory.

9. A method comprising:
creating, in a memory of a computer system, a first data structure having a plurality of slots of the memory, the slots configured to store key-value pairs of an array, and each of the slots corresponding to a key of the key-value pairs;
creating, in the memory of the computer system, a second data structure having a plurality of contiguous buckets of the memory, the buckets configured to store pointers pointing to the slots containing key-value pairs, each of the pointers associated with one of the key-value pairs, and the buckets further configured to store the pointers in the order in which the key-value pairs are inserted into the array, wherein the first data structure and the second data structure together form a combined data structure that represents the array, and wherein the combined data structure includes a first pointer to the first data structure and a second pointer to the second data structure;
obtaining, upon insertion of a new key-value pair into the array,
a new slot from the first data structure corresponding to a new key of the new key-value pair, and
a new bucket from the second data structure to store a pointer to the new slot, the new bucket being contiguous in the memory to previously filled bucket;
storing, in the new slot, the key-value pair; and
storing, in the new bucket, a pointer that points to the new slot.

10. The method of claim 9, wherein the first data structure is a hashtable.

11. The method of claim 10, wherein obtaining, from the first data structure, the new slot corresponding to the new key includes obtaining the new slot by using a hash function on the new key.

12. The method of claim 9 further comprising:
reading the buckets of the second data structure contiguously to obtain an ordered set of pointers; and
reading slots pointed to by the ordered set of pointers to obtain the key-value pairs in the order in which the key-value pairs are inserted into the array.

13. A method comprising:
receiving, by a computer system, a request to create an array data structure for implementing an array of a programming language;
selecting, by the computer system and based on a pre-defined selection criteria, one of a plurality of implementations of the array data structure, the implementations including at least one of a first implementation and a second implementation,
the first implementation including:
a first data structure having a plurality of contiguous buckets of the memory, the buckets configured to store key-value pairs in the order in which the key-value pairs are inserted into the array, and
a second data structure having a plurality of slots of the memory, each of the slots corresponding to one of keys of the key-value pairs, each of the slots configured to store a pointer that points to a bucket of the first data structure containing a key-value pair of a key represented by the slot, wherein the first data structure and the second data structure are different data structures, wherein the first data structure and the second data structure together form a first combined data structure that represents the array, and wherein the first combined data structure includes a first pointer to the first data structure and a second pointer to the second data structure, and
the second implementation including:
a third data structure having a plurality of slots of the memory, the slots configured to store key-value pairs of an array, and each of the slots corresponding to a key of the key-value pairs, and
a fourth data structure having a plurality of contiguous buckets of the memory, the buckets configured to store pointers pointing to the slots containing key-value pairs, each of the pointers associated with one of the key-value pairs, and the buckets further configured to store the pointers in the order in which the key-value pairs are inserted into the array, wherein the third data structure and the fourth data structure are different data structures, wherein the third data structure and the fourth data structure together form a second combined data structure that represents the array, and wherein the second combined data structure includes a third pointer to the third data structure and a fourth pointer to the fourth data structure; and
creating the array data structure based on the selected implementation.

14. The method of claim 13, wherein the pre-defined selection criteria includes at least one of (i) an access pattern of the array, or (ii) size of the array.

15. The method of claim 14, wherein the access pattern includes at least one of (i) a frequency of fetching values of the array in the order they were inserted, (ii) a frequency of fetching the values in a random order, (iii) number of reads/writes performed on the array, or (iv) number of values read from or written into the array.

16. The method of claim 15, wherein selecting one of the implementations based on the access pattern of the array includes selecting the first implementation if at least one of (i) the frequency of fetching the values of the array in the order they were inserted exceeds a first predefined threshold, or (ii) if the size of the array is below a second predefined threshold.

17. The method of claim 15, wherein selecting one of the implementations based on the access pattern of the array includes selecting the second implementation if at least one of (i) the frequency of fetching the values of the array in a random order exceeds a first predefined threshold, (ii) the size exceeds a second predefined threshold, (iii) number of reads/writes performed on the array exceeds a third predefined threshold, or (iv) the number of values read from or written into the array exceeds a fourth predefined threshold.

18. The method of claim 15 further comprising:
tracking, by the computer system, the access pattern and size of the array over a number of executions of a program the array is part of; and
generating a report containing details of the access pattern and size of the array.

19. The method of claim 13 further comprising: resolving a collision in the array data structure using a collision resolution method, the collision resolution method including at least one of (i) chaining, (ii) linear probing, (iii) quadratic probing, (iv) double hashing, or (v) cuckoo hashing.

20. An apparatus comprising:
    a processor; a memory to store instructions which, when executed by the processor, cause the processor to create an array data structure in the memory using one of a first implementation or a second implementation,
    the first implementation including:
    a first data structure having a plurality of contiguous buckets of the memory, the buckets configured to store key-value pairs in the order in which the key-value pairs are inserted into the array, and
    a second data structure having a plurality of slots of the memory, each of the slots corresponding to one of keys of the key-value pairs, each of the slots configured to store a pointer that points to a bucket of the first data structure containing a key-value pair of a key represented by the slot, wherein the first data structure and the second data structure are different data structures, wherein the first data structure and the second data structure together form a first combined data structure that represents the array, and wherein the first combined data structure includes a first pointer to the first data structure and a second pointer to the second data structure, and
    the second implementation including:
    a third data structure having a plurality of slots of the memory, the slots configured to store key-value pairs of an array, and each of the slots corresponding to a key of the key-value pairs, and
    a fourth data structure having a plurality of contiguous buckets of the memory, the buckets configured to store pointers pointing to the slots containing key-value pairs, each of the pointers associated with one of the key-value pairs, and the buckets further configured to store the pointers in the order in which the key-value pairs are inserted into the array, wherein the third data structure and the fourth data structure are different data structures, wherein the third data structure and the fourth data structure together form a second combined data structure that represents the array, and wherein the second combined data structure includes a third pointer to the third data structure and a fourth pointer to the fourth data structure;
    an implementation selection module that selects, based on a pre-defined selection criteria, one of the first implementation and the second implementation; and
    a data structure creation module that creates the array data structure based on the selected implementation.

* * * * *